May 10, 1960  J. B. CRANE  2,935,818
APPARATUS FOR APPLYING LIQUID TO WEEDS OR THE LIKE
Filed May 19, 1958
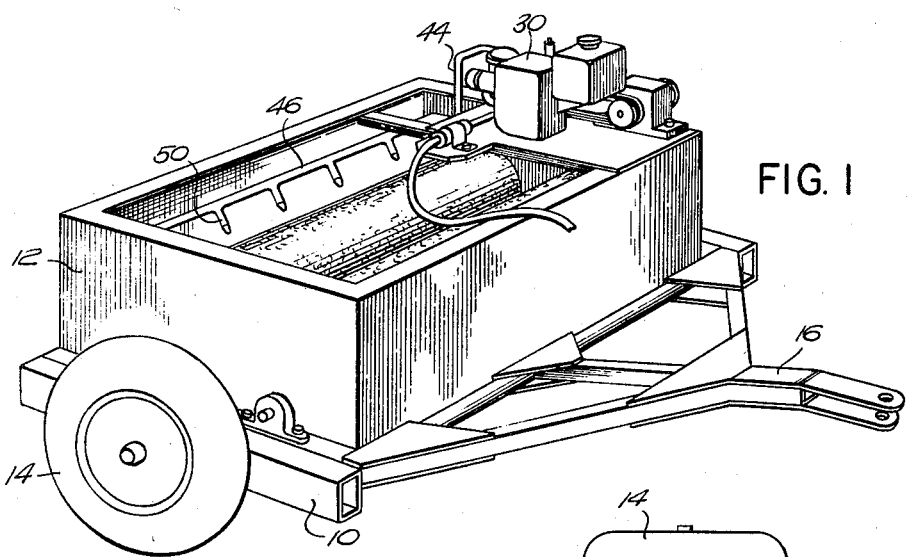
FIG. I
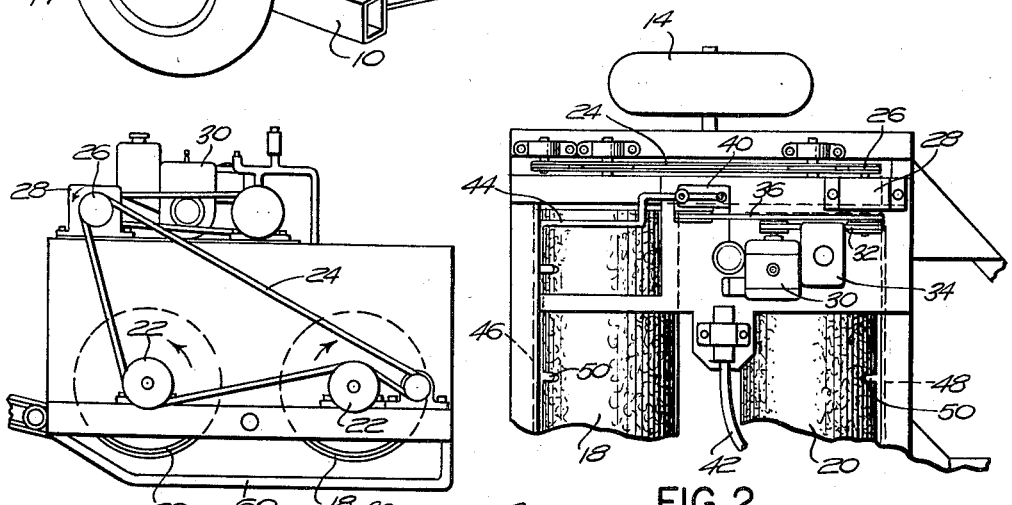
FIG. 3    FIG. 2
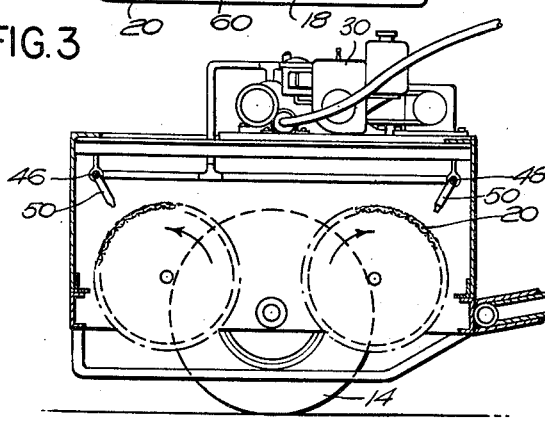
FIG. 4
INVENTOR.
JUDSON BURLEIGH CRANE
BY
Morse + Altman
ATTORNEYS

United States Patent Office 2,935,818
Patented May 10, 1960

2,935,818

APPARATUS FOR APPLYING LIQUID TO WEEDS OR THE LIKE

Judson Burleigh Crane, Millbridge, Maine

Application May 19, 1958, Serial No. 736,018

5 Claims. (Cl. 47—1.5)

This invention relates to an apparatus for applying to weeds or the like a solution of poison for suppression thereof. More particularly, the apparatus is designed for use in blueberry fields to destroy the weeds which grow up above the tops of the blueberry bushes. The apparatus hereinafter described is adapted to be towed behind a truck in which is carried a tank of weed killing solution. The apparatus itself is a two wheeled vehicle comprising a frame or body in which are mounted two horizontal rolls on axes which are parallel to the axes of the vehicle wheels. The vehicle carries a small motor to rotate the rolls and also carries a pump with pipe connection to draw solution from the towing truck and to pump such solution to a series of spray nozzles which spray the solution on the rotating rolls. The rolls apply the solution to the upper leaves of the weeds or other plants which project above the blueberry bushes. For a more complete understanding of the invention reference may be had to the following description thereof and to the drawings, of which—

Figure 1 is a perspective view of an apparatus embodying the invention;

Figure 2 is a fragmentary plan view of the same;

Figure 3 is a side elevation of the same, the vehicle wheels being removed; and

Figure 4 is an elevational view of the other side of the vehicle.

The apparatus illustrated on the drawing comprises a main frame 10 having a body 12 of rectangular box shape mounted thereon. A pair of vehicle wheels 14 are mounted to support the vehicle and a towing bar or tongue 16 is provided to attach the vehicle to a truck by which it can be towed. Within the body 12 are rotatably mounted a pair of horizontal rolls 18 and 20. These rolls are adapted to be rotated in opposite directions, as indicated by the arrows in Fig. 3, when the apparatus is in use. Any suitable means may be employed for rotating these rolls. As shown in Fig. 3, the rolls ar provided with pulley wheels 22 on which runs a belt 24 which also passes over a pulley wheel 26 on a reduction gear unit 28. A prime mover, e.g., a small gasoline engine 30, is connected by a belt 32 to the reduction gear unit 28. The motor 30 is provided with a suitable fuel tank 34. A belt 36 runs from the reduction gear unit 28 to a pump 40. Connected to the suction end of the pump is a supply tube or pipe 42 which is connected to a tank (not shown) mounted on the towing truck. The pump discharge into a pipe 44 which communicates with two horizontal pipes 46 and 48. Each of these pipes has a series of spray nozzles 50 arranged to direct spray onto the cylindrical surfaces of the rolls 18 and 20. These rolls can be constructed as desired. For lightness of weight they can be made of wire netting bent into cylindrical shape and mounted on a suitable inner skeleton frame, the wire being covered by a layer of absorbent material such as thick felt or the like. The spray nozzles 50 keep the felt covers soaked with solution from the tank in the truck. The rolls are rotated in opposite directions as the vehicle is towed so that solution is applied to both sides of the weeds or plants which extend upward above the tops of the blueberry bushes.

In order to protect the rolls 18 and 20 from damage which might be caused by large stones or irregularities of the ground surface over which the vehicle passes, a series of guards 60 are mounted below the rolls 18 and 20, these guards being of sufficient strength to lift or tilt the vehicle if a rock or other outstanding obstruction is encountered.

Various modifications and changes may be made in the embodiment of the invention herein shown and described without departing from the spirit or scope thereof as defined in the following claims.

I claim:

1. Apparatus of the class described comprising a vehicle having a frame and supporting wheels, a cylindrical roll mounted on said frame to rotate about a horizontal axis, a surface layer of absorbent material covering the cylindrical surfaces of said roll, means on said vehicle for rotating said roll, means carried by said frame near said roll for directing liquid sprays against said roll, and a supply pipe on said vehicle communicating with said spraying means for supplying liquid thereto.

2. Apparatus as described in claim 1, said apparatus including a pump on said vehicle connected to said supply pipe.

3. Apparatus as described in claim 2, said apparatus including a prime mover on said vehicle operatively connected to said pump.

4. Apparatus of the class described, comprising a vehicle having a frame and supporting wheels, two cylindrical rolls rotatably mounted on said frame, means for driving said rolls in opposite directions, said means consisting of a motor mounted on said frame, and driving connections between said motor and said rolls, spray nozzles mounted on said frame to direct spray against said rolls, a pump operatively connected to said motor, pipe connections from said pump to said nozzles, and covers of absorbent material on the cylindrical surfaces of said rolls.

5. Apparatus as described in claim 4, and a series of fixed guard members mounted on said frame and extending transversely beneath said rolls.

References Cited in the file of this patent

UNITED STATES PATENTS

| 1,507,595 | Goode | Sept. 9, 1924 |
| 1,523,590 | Hartshorn | Jan. 20, 1925 |
| 1,551,327 | Pearce | Aug. 25, 1925 |
| 2,158,115 | Fullilove | May 16, 1939 |

FOREIGN PATENTS

| 114,164 | Australia | Nov. 13, 1941 |
| 338,163 | Great Britain | Nov. 12, 1930 |